Aug. 31, 1926.
W. T. SPARROW
1,598,401
PIN OR BOLT RETAINER FOR BRAKE RIGGING AND THE LIKE
Filed July 31, 1925
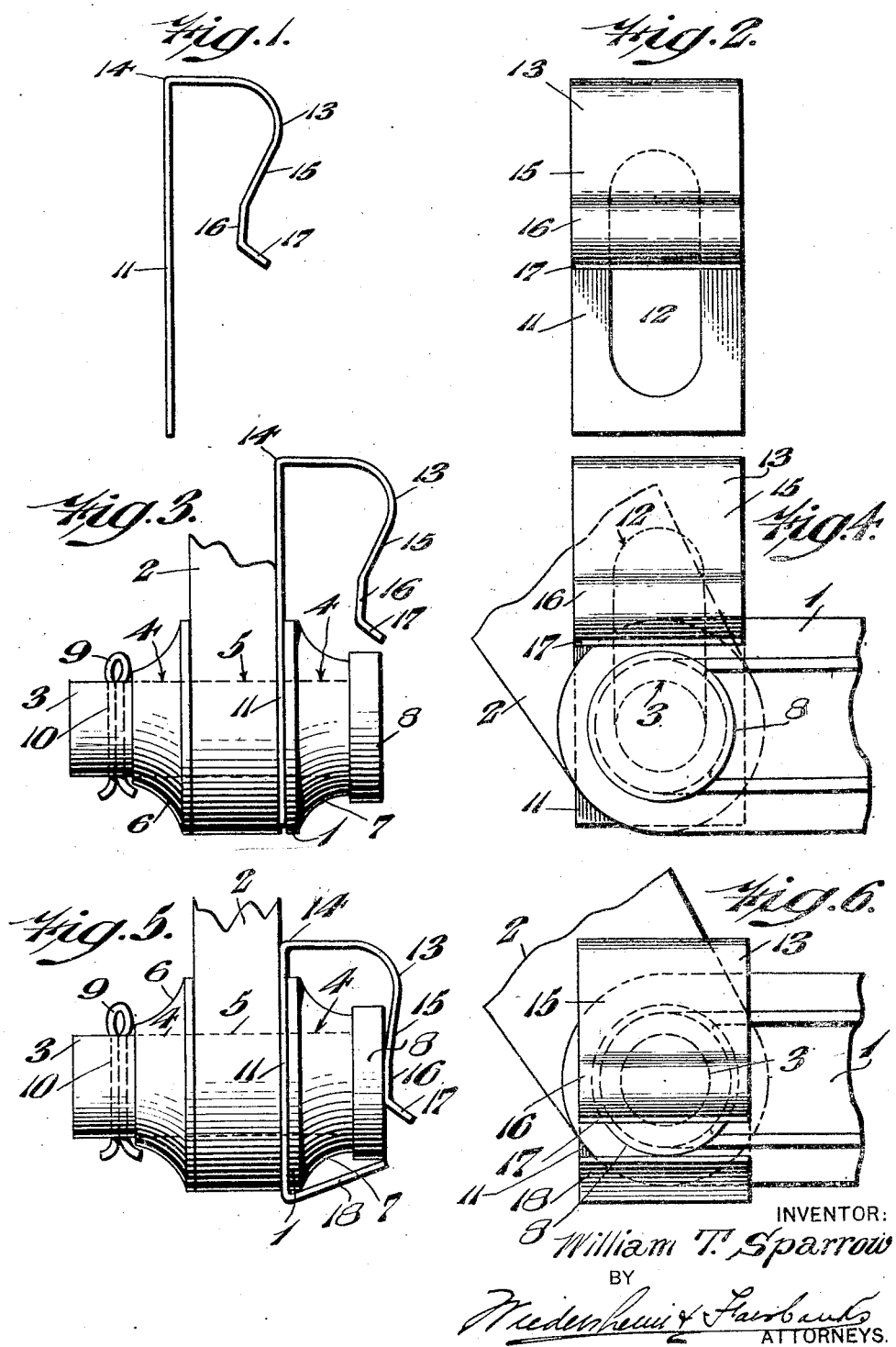
INVENTOR:
William T. Sparrow
BY
ATTORNEYS.

Patented Aug. 31, 1926.

1,598,401

UNITED STATES PATENT OFFICE.

WILLIAM T. SPARROW, OF HAMPTON, VIRGINIA.

PIN OR BOLT RETAINER FOR BRAKE RIGGING AND THE LIKE.

Application filed July 31, 1925. Serial No. 47,327.

My invention relates to a new and useful pin or bolt retainer for brake rigging and the like, and it relates more particularly to a form of pin or bolt retainer which will exert a positive pressure upon the end of the bolt, so as to force the same inwardly thereby preventing the loss of the same.

My invention further relates to a retaining device to prevent the loss of pins or bolts from brake rigging on cars, which will not be as liable to breakage as cotter pins, and which, moreover, may be used in addition to cotter pins so as to prevent the loss of the bolts or pins in the event that the cotter pin is broken or detached.

For the purpose of illustrating my invention, I have shown in the accompanying drawings a form thereof which will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings:—

Figure 1 represents a side elevation of a novel pin or bolt retainer, embodying my invention.

Figure 2 represents a plan view of the same.

Figure 3 represents a front elevation of a brake rigging connection having a bolt retainer of my novel construction partially applied thereto.

Figure 4 represents a side elevation of the same.

Figure 5 represents a front elevation of a connection for brake rigging or the like, having the bolt retainer fully applied thereto.

Figure 6 represents a side elevation of the same.

Referring to the drawings, in which like reference characters indicate like parts, 1 designates the terminal portion of a brake rod or the like, which is pivotally connected to the end of an arm or lever 2, by means of the pivot pin or bolt 3 passing through suitable openings 4 in the forked ends 6 and 7 of the bifurcated terminal portion of the rod 1 and the opening 5 in the end of the lever 2. The bolt or pin 3 is provided with the head 8 on one end thereof, and may or may not be provided with a cotter pin 9, passing through a suitable opening 10 near the end thereof.

My novel bolt retainer consists of the relatively thin sheet metal plate 11, having therein an elongated opening 12, and the spring pressure member 13, carried at one end thereof and formed integral therewith, and extending substantially parallel thereto; said pressure member being formed by merely bending said plate at a point 14. The spring pressure member is inclined towards the plate 11, as at 15, and has a contact portion 16 opposed to the opening 12 in the plate 11, which contact portion 16, is further provided with an outwardly inclined guide lip 17.

In applying my novel pivot pin or bolt retainer to the connection or hinged joint, shown in Figures 3 to 6 inclusive, the end of the lever or rod 2 is placed between the bifurcated or forked ends 6 and 7, with the opening 5 in the end of the rod 2 in alignment with the openings 4. The plate 11 is then inserted, in a manner shown in Figures 3 and 4, between the rod or lever 2 and one of the bifurcated ends 6 and 7, as shown in Figure 3. The bolt 3 is then passed through the opening 4, the elongated opening 12 in the plate 11, the corresponding opening 5 in the lever 2, and finally through the second opening 4 in the bifurcated end 6 of the rod 1. The retainer is then forced towards the center of the bolt 3, into a position shown in Figure 5, the elongated opening 12 permitting such movement.

The spring pressure member 13, will then be distended by the engagement of the outwardly inclined guide lip 17 with the edge of the head 8 of the pin or bolt 3, and will be opened into a position shown in Figure 5, with the contact portion 16 bearing and pressing against the end surface of the head 8 of the pin 3, thereby forcing said pin inwardly, so as to retain the same in position at all times. The free end 18 of the plate 11 is then turned or bent outwardly as shown in Figure 5, thereby positively locking the retainer in position and preventing the accidental removal or the working loose of the same.

If desired, this retainer may be used in conjunction with a cotter pin 9, or entirely independently thereof, as the case may be.

It will be apparent that any longitudinal movement or displacement of the coupling or connecting pins or bolts is entirely eliminated by the pressure on the ends of such pins or bolts. My novel retainers may further be made of any desired size and can be made at very low cost, by punching the same out of sheet metal. The dimensions and proportions of the retainer are necessarily made to fit the particular bolt or connection. It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent is:—

1. In combination, a pivotal connection consisting of a pivot pin and a pin retainer comprising a plate inserted between the pivotally connected parts and extending over an end of the pin, there being an elongated opening in the plate extending longitudinally thereof and receiving the pivot pin, a spring pressure member carried by one end of the plate and exerting a continuous pressure upon the end of the pin when the retainer is in place, and a guide lip carried by said spring pressure member for guiding said spring pressure member over the end of said pin in positioning the retainer, the other end of the plate being terminally deflected for locking the retainer in position.

2. In combination, a pivotal connection consisting of a pivot pin and a pin retainer comprising a plate inserted between the pivotally connected parts and extending over an end of the pin, there being an elongated opening in the plate extending longitudinally thereof and receiving the pivot pin, and a spring pressure member carried by one end of the plate and exerting a continuous pressure upon the end of the pin when the retainer is in place, the other end of the plate being terminally deflected for locking the retainer in position.

3. A device of the character stated, an elongated plate, having an elongated opening therein extending longitudinally thereof, and a resilient pressure member carried by one end of said plate, formed integral therewith and extending substantially parallel thereto, said pressure member being slightly bowed, with the convexity thereof juxtaposed to said opening in said plate, the free end of said pressure member being turned outwardly to form an inclined guide lip.

4. A pin retainer for pivotal connections and the like comprising a plate adapted to be inserted between the pivotally connected parts of a connection, an elongated opening in said plate extending longitudinally thereof and adapted to receive the pivot pin of said connection, a spring pressure member carried in spaced relation thereto and extending substantially parallel thereto, said pressure member adapted to exert a continuous pressure upon the end of the pin in a direction parallel to the axis of the pin when said retainer is in place, and an inclined guide lip carried by said spring pressure member for guiding the same over the end of said pin in positioning said retainer, the plate being long enough to be terminally deflected for locking said retainer in position.

WILLIAM T. SPARROW.